(No Model.)
E. D. DOUGHERTY.
CONDUIT FOR CABLE RAILWAYS.
No. 364,500. Patented June 7, 1887.
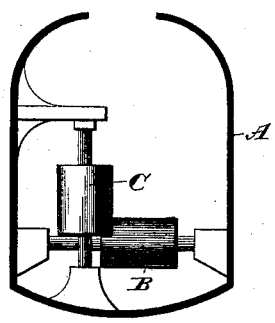
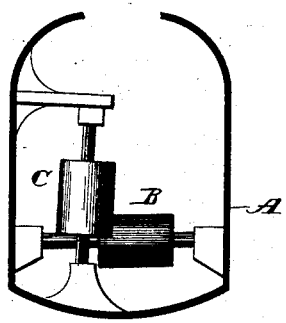
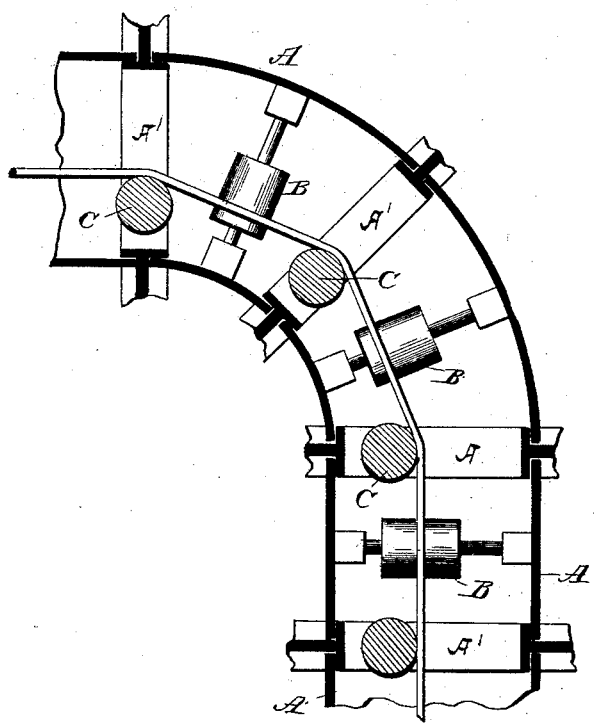
WITNESSES
S. G. Nottingham
G. F. Downing
INVENTOR
E. D. Dougherty
By Burgett & Burgett
Attorneys

United States Patent Office.

EDWARD D. DOUGHERTY, OF PHILADELPHIA, PENNSYLVANIA.

CONDUIT FOR CABLE RAILWAYS.

SPECIFICATION forming part of Letters Patent No. 364,500, dated June 7, 1887.

Application filed September 24, 1886. Serial No. 214,439. (No model.)

*To all whom it may concern:*

Be it known that I, EDWARD D. DOUGHERTY, of Philadelphia, in the county of Philadelphia and State of Pennsylvania, have invented certain new and useful Improvements in Conduits for Cable Railways; and I do hereby declare the following to be a full, clear, and exact description of the invention, such as will enable others skilled in the art to which it appertains to make and use the same.

This invention relates to conduits for cable railways, and more particularly to the pulleys that support the cable and the method of locating said pulleys in the conduit tube or pipe.

The object of the invention is to reduce the wearing-surface at points of support of the cable on straight track as well as on curves, and thus obviate excessive friction on and consequent wear of the cable.

With this end in view my invention embraces certain features of construction and combination of parts, as will be hereinafter described, and pointed out in the claims.

In the drawings making a part of this specification, Figure 1 is a transverse section of the conduit-pipe with cable-supporting pulleys in relative position. Fig. 2 is a plan view in longitudinal axial section of a curved conduit-pipe, showing relative location of pulleys on curves of railway. Fig. 3 is a cross-section of a conduit-tube, showing pulleys inclined on their axis.

Referring to the drawings by letters, A are the sections of a conduit-pipe made of suitable material and of preferred form, substantially as shown in the drawings, and supported at suitable intervals by the brackets A', which latter may be of any approved construction. At proper intervals in the conduit-sections between the brackets, are interiorly located the plain-faced pulleys B. These pulleys are made of the same diameter and width, the dimensions being proportioned to the diameter of the conduit-tube, so as to attain the best results. It will be noticed that these pulleys B are secured on horizontally-revolving shafts, the journaled ends of which rest in bracket-boxes affixed to or cast integral with the wall of the conduit-pipe. A series of these pulley-wheels are located in a line of conduit-tube at proper distances apart. Alternately between the horizontal pulleys B the pulleys C are situated. These pulleys are plain faced, and similar in dimensions to the horizontal pulleys B, and are secured upon shafts of proper length, which latter are journaled at their ends in boxes secured to or formed integral with the brackets A', which, as before stated, are located between and support the sections of the conduit.

It will be noticed that in the arrangement of the upright and horizontal plain-faced pulleys the points of contact with the cable for its support are reduced to a line, and therefore the frictional abrasion of the material of said cable will be comparatively slight, and its longevity thereby proportionally increased.

As before stated, the faces of the pulleys B, that are horizontally located, will form a right angle with the faces of pulleys C, that are in a vertical plane, as shown in Figs. 1 and 2. It is evident that the principle of alternating horizontal and upright pulleys will not be departed from by giving the upright and horizontal pulleys moderate inclination from the preferred positions above described, as the cable will travel equally as well upon the inclined faces of the supporting and guiding pulleys.

Having fully described my invention, what I claim as new, and desire to secure by Letters Patent, is—

1. In a conduit for cable railways, the combination, with a series of brackets and conduit or pipe sections located between and supported by the brackets, of a series of horizontal plain-faced pulleys and a series of vertical plain-faced pulleys, one series of pulleys being journaled in boxes secured to the sections of the conduit or pipe and the other series journaled in bearings secured to the brackets, substantially as set forth.

2. The combination, with a series of brackets and a series of conduit or pipe sections, of two series of plain-faced pulleys, the planes of motion of each series of pulleys being inclined to the other series, substantially as set forth.

In testimony whereof I have signed this specification in the presence of two subscribing witnesses.

EDWARD D. DOUGHERTY.

Witnesses:
ELLWOOD BONSALL,
CHARLES S. BONSALL.